United States Patent [19]
Sato

[11] Patent Number: 6,040,723
[45] Date of Patent: Mar. 21, 2000

[54] INTERFACE CIRCUIT WITH HIGH SPEED DATA TRANSMISSION

[75] Inventor: Hisatake Sato, Miyazaki, Japan

[73] Assignee: Oki Electric Industry Co., Ltd., Tokyo, Japan

[21] Appl. No.: 09/114,518

[22] Filed: Jul. 13, 1998

[30] Foreign Application Priority Data

Jul. 17, 1997 [JP] Japan .................................. 9-192405

[51] Int. Cl.[7] ....................................................... H04L 7/00
[52] U.S. Cl. ............................................ 327/144; 327/141
[58] Field of Search .................................... 327/141, 144, 327/145, 291, 295; 395/551; 713/400

[56] References Cited

U.S. PATENT DOCUMENTS

| | | | |
|---|---|---|---|
| 5,022,057 | 6/1991 | Nishi et al. ............................. | 327/141 |
| 5,886,552 | 3/1999 | Chai et al. ............................. | 327/165 |

*Primary Examiner*—Tuan T. Lam
*Attorney, Agent, or Firm*—Jones Volentine, LLP

[57] ABSTRACT

An interface circuit with high speed data transmission is disclosed. The interface circuit comprises a clock signal generator outputting a clock signal and an inversion clock signal, a shift signal generator receiving a start signal, the clock signal and the inversion clock signal. The shift signal generator outputs shift signals having odd shift signals and even shift signals. A first signal of the odd shift signals is generated in response to the start signal and the clock signal. The even shift signal is generated in response to a previous odd signal and the inversion clock signal. The odd shift signal is generated in response to a previous even signal and the clock signal. The interface circuit further comprises a data distribution circuit and odd and even output circuits. The data distribution circuit receives data, the clock signal and the inversion clock signal and outputs odd data in response to the data and the clock signal and even data in response to the data and the inversion clock signal. The odd data output circuit receives the odd data and outputs the received data in response to the odd signal. The even data output circuit receives the even data and outputs the received data in response to the even signal.

20 Claims, 4 Drawing Sheets

INTERFACE CIRCUIT WITH HIGH SPEED DATA TRANSMISSION

BACKGROUND OF THE INVENTION

This invention relates to an interface circuit for transferring data from a central processing unit (hereinafter called "CPU") to a peripheral device like a liquid crystal display (hereinafter called "LCD") at high speed. This invention also relates particularly to an interface circuit which has taken countermeasures against noise produced incident to the transfer of data at high speed.

An interface circuit has a shift register supplied with a clock signal indicative of data transfer timing and a start signal indicative of the start of data transfer from a CPU, and a data latch which is sequentially supplied with display data from the CPU and holds these data therein for their display.

A display unit such as an LCD or the like has recently been increased in screen size. With its increase, the amount of data to be transmitted is increasing. A display cycle per screen is substantially determined depending on human eye's characteristics. Thus, the increase in the amount of data must be solved by the speeding up of a transfer rate. The speeding up of the transfer rate needs to increase the frequency of a data transfer clock signal. However, the increase in the frequency of the clock signal will increase a current to be used up or consumed by an interface circuit.

When the frequency of the clock signal is made greater, a high-frequency signal is radiated outside, so-called EMI (Electromagnetic Interference) noise is produced.

SUMMARY OF THE INVENTION

With the foregoing in view, it is therefore an object of the present invention to provide an interface circuit capable of increasing the amount of data to be transferred without increasing the frequency of a clock signal.

An interface circuit of the present invention comprises a clock signal generator outputting a clock signal and an inversion clock signal, a shift signal generator receiving a start signal, the clock signal and the inversion clock signal. The shift signal generator outputs shift signals having odd shift signals and even shift signals. A first signal of the odd shift signals is generated in response to the start signal and the clock signal. The even shift signal is generated in response to a previous odd signal and the inversion clock signal. The odd shift signal is generated in response to a previous even signal and the clock signal.

The interface circuit of the present invention further comprises a data distribution circuit and odd and even output circuits. The data distribution circuit receives data, the clock signal and the inversion clock signal and outputs odd data in response to the data and the clock signal and even data in response to the data and the inversion clock signal. The odd data output circuit receives the odd data and outputs the received data in response to the odd signal. The even data output circuit receives the even data and outputs the received data in response to the even signal.

Typical ones of various inventions of the present application have been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

Preferred embodiments of the present invention will hereinafter be described with reference to the accompanying drawings.

Figure 1:
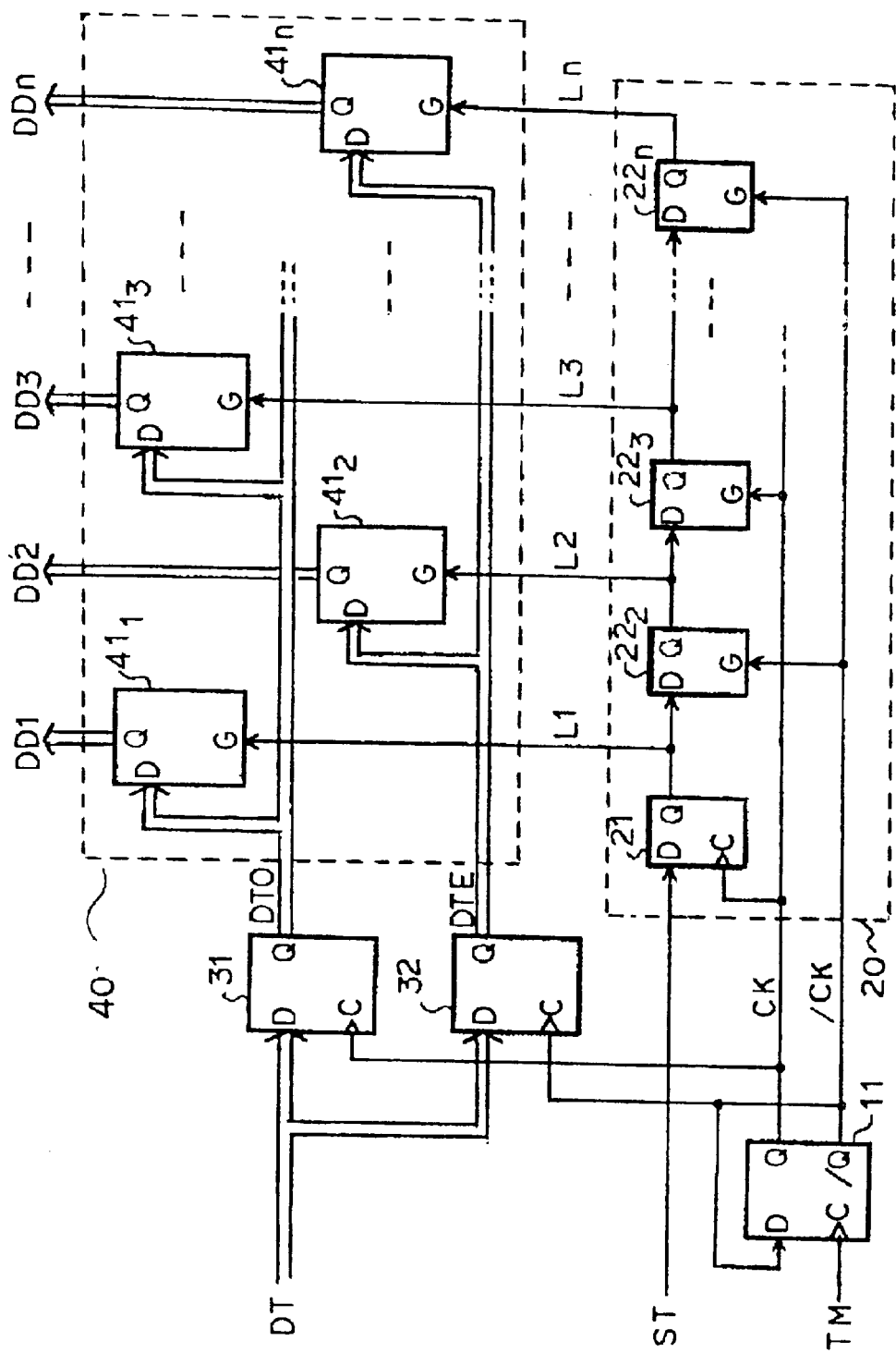
FIG. 1 is a block diagram of an interface circuit showing a first embodiment of the present invention.

FIG. 1 is a block diagram of an interface circuit showing a first embodiment of the present invention.

The interface circuit has a frequency dividing circuit (e.g., a delay FF) 11. A clock terminal C of the FF 11 is supplied with a data timing signal TM indicative of data transfer timing from an unillustrated CPU or the like. An inverse output terminal /Q (where "/" means the inverse of Q) of the FF 11 is electrically connected to an input terminal D. The FF 11 divides the frequency of the data timing signal TM into ½. As a result, a clock signal CK synchronized with the leading edge of the data timing signal TM is outputted from an output terminal Q. Further, a clock signal /CK indicative of the inverse of the clock signal (inversion clock signal) CK is outputted from the inverse output terminal /Q.

The relationship between the clock signal and the inverse of the clock signal can be seen from three point of views. As has described, the first relationship between two signals is inverse relationship. Second, the inverse of the clock signal is delayed half phase thereof from the clock signal. Finally, the inverse of the clock signal is shifted 180 degrees from the clock signal.

The interface circuit has a shift circuit (e.g., shift register) 20. The shift register 20 is constructed so that a synchronous FF, i.e., a delay FF 21 is provided as a first-stage register and n-1 stage register comprised of latches $22_2, 22_3, \ldots, 22_n$ used as cascade-connected asynchronous FFs are electrically connected to a stage subsequent to the FF 21. An input terminal D of the FF 21 is supplied with a start signal ST indicative of the start of data DT from the CPU or the like. A clock terminal C of one register corresponding to the odd-numbered stage in the shift register 20, i.e., the FF 21 and enable terminals G of other register corresponding to the odd-numbered stages in the shift register 20, i.e., the latches $22_3, 22_5, \ldots$ are respectively supplied with the clock signal CK outputted from the FF 11. Enable terminals G of holders corresponding to the even-numbered stages in the shift registers 20, i.e., the latches $22_2, 22_4, \ldots$ are respectively supplied with the clock signal /CK outputted from the FF 10. Latch signals L1, L2, ..., Ln are respectively outputted from output terminals Q of the respective registers which serve as the FF 21 and the latches $22_2$ through $22_n$.

Moreover, the interface circuit has first and second temporally store circuits (e.g., delay FFs) 31 and 32 as a data distribution circuit. Input terminals D of the FFs 31 and 32 are commonly supplied with data DT outputted from the CPU or the like. Respective clock terminals C of the FFs 31 and 32 are respectively supplied with the clock signals CK and /CK outputted from the FF 11.

A data latch 40 made up of n latches $41_1, 41_2, \ldots, 41_n$ is electrically connected to output terminals Q of the FFs 31 and 32. Namely, input terminals D of first data holding means (e.g., latches corresponding to odd-numbered stages) $41_1, 41_3, \ldots$ are electrically commonly connected to the output terminal Q of the FF 31. Input terminals D of second data holding means (e.g., latches corresponding to even-numbered stages) $41_2, 41_4, \ldots$ are electrically commonly connected to the output terminal Q of the FF 32. Further, enable terminals G of the respective latches $41_1$ through $41_n$ in the data latch 40 are respectively supplied with the latch signals L1 through Ln outputted from the shift register 20.

Figure 2:
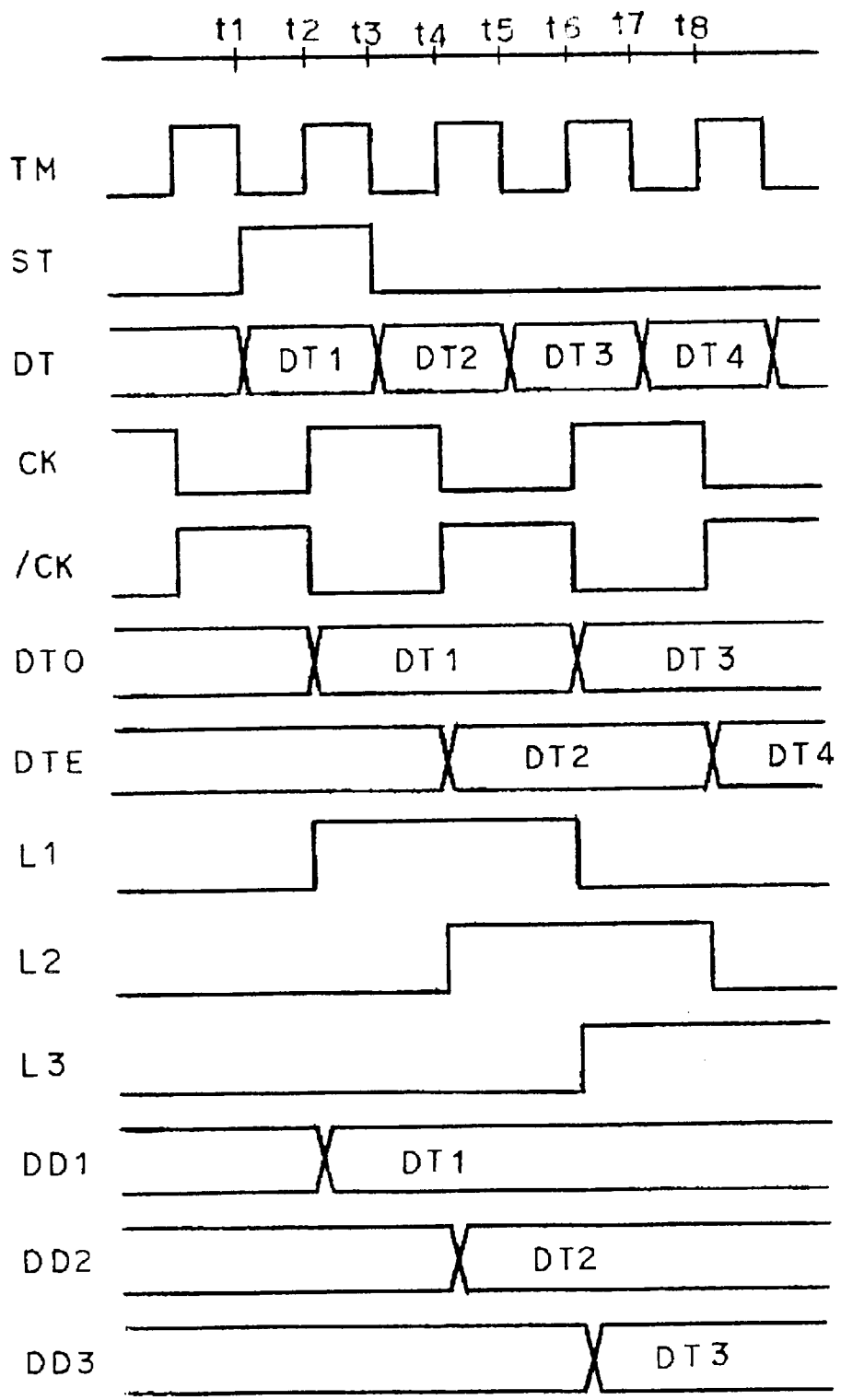
FIG. 2 is a timing chart for describing the sequence of operation of the interface circuit shown in FIG. 1.

FIG. 2 is a timing chart for describing the sequence of operation of the interface circuit shown in FIG. 1. The operation of the interface circuit shown in FIG. 1 will be explained below with reference to FIG. 2.

The frequency of a data timing signal TM is divided into halves by the FF 11 shown in FIG. 1. Namely, a clock signal CK, which is alternately changed to levels "H" and "L" in synchronism with the leading edge of the data timing signal TM, and a clock signal /CK obtained by inverting the clock signal CK are generated by the FF 11 shown in FIG. 1.

At time t1 in FIG. 2, a start signal ST changes to the level "H" in synchronism with the trailing edge of the data timing signal TM, and data of "DT1" is outputted as data DT from the CPU or the like in conjunction with it.

When the data timing signal TM rises at time t2, the clock signal CK generated by the FF 11 changes from the levels "L" to "H". Since the clock terminal C of the FF 31 is supplied with the clock signal CK, the data DT is retained or held in the FF 31 in accordance with the rise timing of the clock signal CK. Thus, an odd-numbered data signal DTO on the output side of the FF 31 results in "DT1".

On the other hand, since the start signal ST is supplied to the input terminal D of the FF 21 in the shift register 20, it is held by the FF 21 on the rising edge of the clock signal CK and a latch signal L1 outputted from the FF 21 changes to the level "H". Further, since the latch signal L1 is supplied to the enable terminal G of the latch $41_1$, an odd data signal DTO outputted from the FF 31 is held by the latch $41_1$, so that a signal DD1 outputted from the latch $41_1$ results in "DT1".

At time t3, the data timing signal TM falls and the start signal ST changes to the level "L". Further, the data DT is changed to "DT2".

When the data timing signal TM rises at time t4, the clock signal /CK generated from the FF 11 changes from the levels "L" to "H". Since the clock terminal C of the FF 32 is supplied with the clock signal /CK, the data DT is latched into the FF 32 according to the leading edge of the clock signal /CK. As a result, an even data signal DTE on the output side of the FF 32 is brought to "DT2".

On the other hand, since the latch signal L1 is supplied to an input terminal D of the latch $22_2$ in the shift register 20, it is held by the latch $22_2$ in response to the leading edge of the clock signal /CK and a latch signal L2 outputted from the latch $22_2$ changes to the level "H". Further, since the latch signal L2 is supplied to the enable terminal G of the latch $41_2$, the even data signal DTE outputted from the FF 32 is held by the latch $41_2$, so that a signal DD2 outputted from the latch $41_2$ is brought to "DT2".

The data DT is changed to "DT3" in synchronism with the trailing edge of the data timing signal TM at time t5.

When the data timing signal TM rises at time t6, the clock signal CK generated from the FF 11 changes from the levels "L" to "H". Thus, the odd data signal DTO on the output side of the FF 31 is brought to "DT3".

Since the start signal ST supplied to the input terminal D of the FF 21 is taken "L", the latch signal L1 changes to the level "L" according to the leading edge of the clock signal CK. Thus, the signal supplied to the enable signal G of the latch $41_1$ changes to the level "L" and hence the output signal DD1 of the latch $41_1$ is held as "DT1" as it is.

On the other hand, since the latch signal L2 is taken "H", a latch signal L3 outputted from the latch $22_3$ changes to the level "H" according to the rising edge of the clock signal CK. Further, since the latch signal L3 is supplied to the enable terminal G of the latch $41_3$, the odd data signal DTO outputted from the FF 31 is held by the latch $41_3$ so that a signal DD3 outputted from the latch $41_3$ is brought to "DT3".

The data DT is changed to "DT4" in synchronism with the trailing edge of the data timing signal TM at time t7.

When the data timing signal TM rises at time t8, the clock signal /CK changes from the levels "L" to "H". Thus, the even data signal DTE on the output side of the FF 32 is brought to "DT4". Further, since the latch signal L1 supplied to the input terminal D of the latch $22_2$ is taken "L", the latch signal L2 changes to the level "L" according to the leading edge of the clock signal /CK. As a result, the signal supplied to the enable terminal G of the latch $41_2$ changes to the level "L" so that the output signal DD2 of the latch $41_2$ is held while remaining at "DT2".

On the other hand, since the latch signal L3 is taken "H", the latch signal L4 outputted from the latch $22_4$ changes to the level "H" according to the leading edge of the clock signal /CK. Further, since the latch signal L4 is supplied to the enable terminal G of the latch $41_4$, the even data signal DTE outputted from the FF 32 is held by the latch $41_4$ so that a signal DD4 outputted from the latch $41_4$ is brought to "DT4".

By repeating the above-described operation, the pieces of data DT sequentially supplied from the CPU or the like are successively held in their corresponding latches $41_1$ through $41_n$ in the data latch 40. The data of "DT1" through "DTn" are outputted from the latches $41_1$ through $41_n$ as the output signals DD1 through DDn respectively.

Thus, the interface circuit according to the first embodiment has the FF 11 for dividing the frequency of the data timing signal TM indicative of the timing for the transfer of the data DT into ½ to thereby generate the clock signals CK and /CK having the ½-divided frequencies respectively, and the shift register 20, FFs 31 and 32 and data latch 40 used for sequentially holding the data DT with rise timing of these clock signals CK and /CK. Therefore, the data can be transferred under the clock signals CK and /CK each having the ½-divided frequency employed in the conventional interface circuit. Accordingly, the above-described problems can be solved.

Further, since the shift register 20 comprises the latches $22_2$ through $22_n$ serving as the asynchronous FFs, the shift register 20 has an advantage in that it can be simplified in circuit scale as compared with the shift register 1 comprised of the conventional synchronous FFs $1_1$ through $1_n$.

Figure 3:
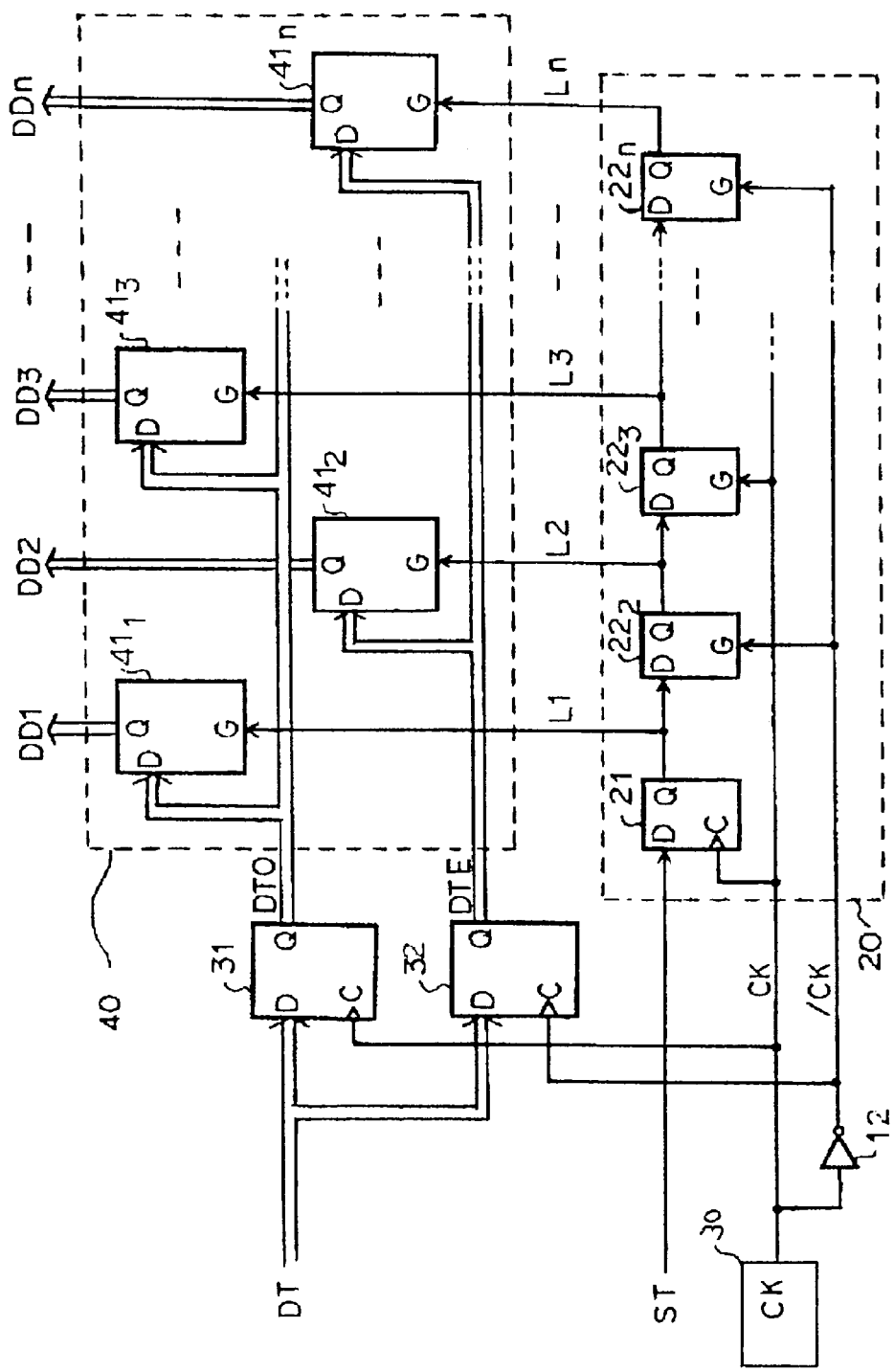
FIG. 3 is a block diagram of an interface circuit illustrating a second embodiment of the present invention.

FIG. 3 is a block diagram of an interface circuit showing a second embodiment of the present invention. Elements of structure common to those illustrated in FIG. 1 are identified by common reference numerals.

This type of interface circuit is equivalent to an interface circuit supplied with a clock signal CK whose "L" and "H"

levels change according to a change in data DT supplied from a CPU or the like, for example. Namely, the interface circuit is directly supplied with a clock signal CK obtained by ½-dividing the frequency of the data timing signal TM shown in FIG. 1 without having to use the data timing signal TM. That is, the clock signal is supplied from the clock source 30. Therefore, the FF 11 shown in FIG. 1 is omitted and an inverter 12 for generating an inverse clock signal /CK obtained by inverting the given clock signal CK is provided. Other configurations of the interface circuit are similar to those shown in FIG. 1.

The interface circuit according to the second embodiment is similar in data transfer operation to the interface circuit according to the first embodiment and has an advantage similar to that obtained by the interface circuit according to the first embodiment. Further, since the frequency of the clock signal CK supplied from the CPU or the like is brought to ½, the interface circuit according to the second embodiment has an advantage in that EMI noise from a clock transmission path is reduced.

Figure 4:
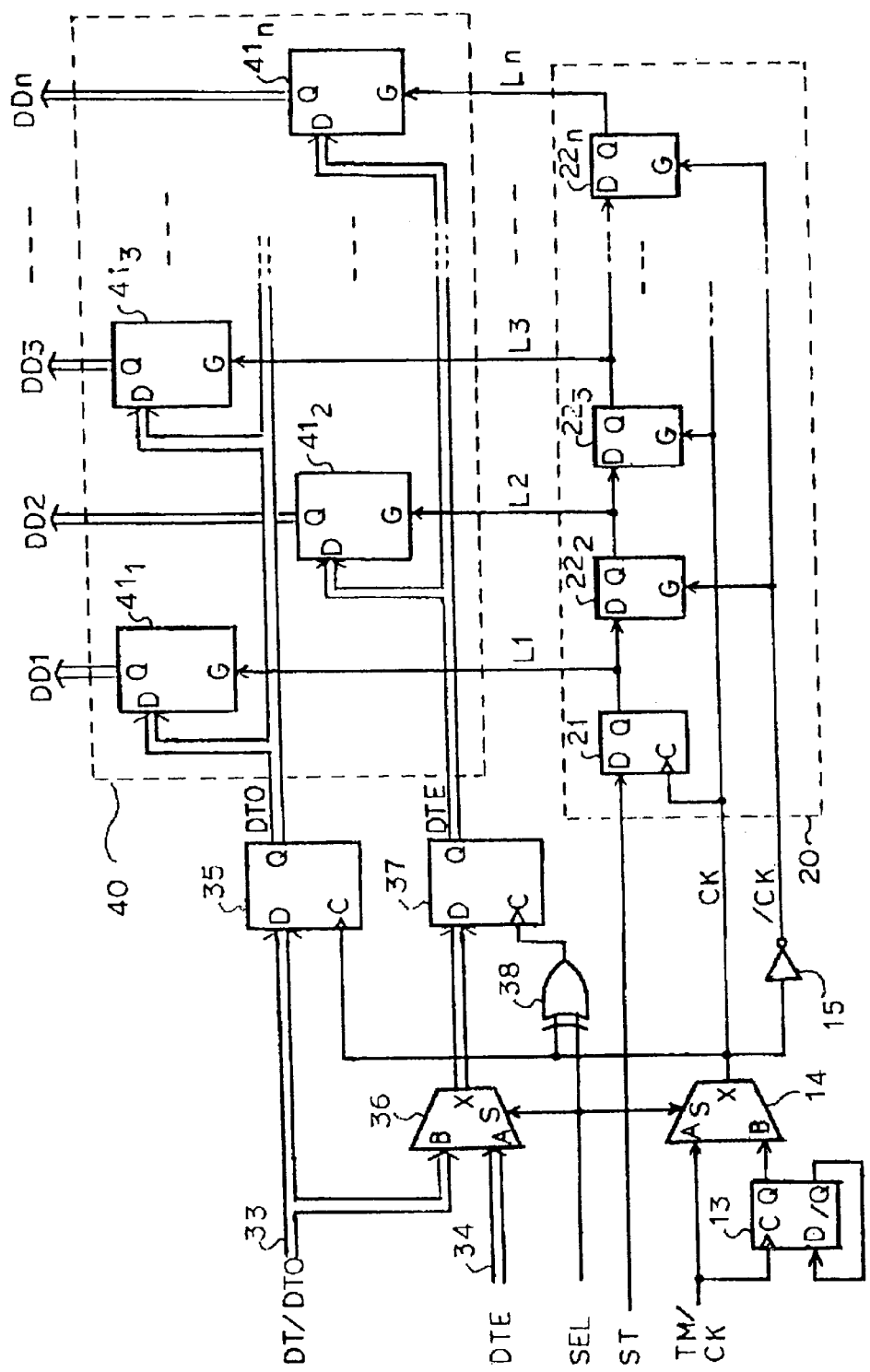
FIG. 4 is a block diagram of an interface circuit depicting a third embodiment of the present invention.

FIG. 4 is a block diagram of an interface circuit showing a third embodiment of the present invention. Elements of structure common to those shown in FIG. 1 are identified by common reference numerals.

This type of interface circuit is equivalent to one capable of separating data DT successively supplied from a CPU or the like into odd data signals DTO, i.e., "DT1", "DT3", "DT5", . . . and even data signals DTE, i.e., "DT2", "DT4", "DT6", . . . in advance, for example and supplying them through different data lines 33 and 34.

The interface circuit has a delay FF 13 and a selector 14. A clock terminal C of the FF 13 and an input terminal A of the selector 14 are supplied with either a data timing signal TM or a clock signal CK. An output terminal /Q of the FF 13 is electrically connected to an input terminal D thereof. Further, an output terminal Q of the FF 13 is electrically connected to an input terminal B of the selector 14. A selection terminal S of the selector 14 is supplied with a select signal SEL. When the select signal SEL is taken "L", the input terminal A of the selector 14 is selected and thereby connected to an output terminal X thereof. On the other hand, when the select signal SEL is taken "H", an input terminal B of the selector 14 is selected and thereby connected to the output terminal X thereof. The output of the selector 14 is electrically connected to a holder corresponding to an odd-numbered stage in a shift register 20, i.e., a clock terminal C of an FF 21 and enable terminals G of other holders corresponding to odd-numbered stages therein, i.e., latches $22_3$, $23_5$, . . . Further, the output of the selector 14 is electrically connected via an inverter 15 to enable terminals G of holders corresponding to even-numbered stages in the shift register 20, i.e., latches $22_2$, $22_4$, . . .

Further, the interface circuit has a data line 33 supplied with data DT or odd data signals DTO, and a data line 34 supplied with even data signals DTE. The data line 33 is electrically connected to an input terminal D of a delay FF 35 and an input terminal B of a selector 36. The data line 34 is electrically connected to an input terminal A of the selector 36. A selection terminal S of the selector 36 is supplied with the select signal SEL. When the select signal SEL is "L", the input terminal A of the selector 36 is selected and thereby connected to an output terminal X of the selector 36. On the other hand, when the select signal SEL is "H", the input terminal B thereof is selected and thereby connected to the output terminal X thereof. The output of the selector 36 is electrically connected to an input terminal D of a delay FF 37.

A clock terminal C of the FF 35 is supplied with the clock signal CK from the output terminal X of the selector 14, and an output terminal Q thereof is electrically commonly connected to input terminals D of odd-numbered latches $41_1$, $41_3$, . . . in a data latch 40. The select signal SEL and the clock signal CK outputted from the selector 14 are supplied to a clock terminal C of the FF 37 through an exclusive OR gate (hereinafter called "EOR") 38. An output terminal Q of the FF 37 is electrically commonly connected to input terminals D of even-numbered latches $41_2$, $41_4$, . . . in the data latch 40.

A description will next be made of the operation (i) of the interface circuit at the time that the select signal SEL is "L" and the operation (ii) thereof at the time that the select signal SEL is "H".

(i) Operation at the time the select signal SEL is "L":

Data DT supplied from the unillustrated CPU or the like is separated into odd-numbered data and even-numbered data. Odd data signals DTO are supplied through the data line 33, whereas even data signals DTE are supplied through the data line 34. The input terminal A of the selector 14 is supplied with a clock signal CK.

On the other hand, since the select signal SEL is set to the level "L", the input terminals A of the respective selectors 14 and 36 are respectively selected and thereby electrically connected to the output terminals X thereof. Thus, the clock terminal C of the FF 35 is supplied with the clock signal CK and the odd data signal DTO are held by the FF 35 with the rise timing of the clock signal CK, followed by supply to the data latch 40. Further, the clock terminal C of the FF 37 is supplied with the clock signal CK through the EOR 38 and the even data signals DTE are held by the FF 37 with the rise timing of the clock signal CK, followed by supply to the data latch 40.

The shift register 20 and the data latch 40 are similar in operation to those employed in the first embodiment.

(ii) Operation at the time the select signal SEL is "H":

Data DT is sequentially supplied from the unillustrated CPU or the like via the data line 33. A data timing signal TM is supplied to the clock terminal C of the FF 13.

On the other hand, since the select signal SEL is set to the level "H", the input terminals B of the respective selectors 14 and 36 are selected and thereby electrically connected to the output terminals X. As a result, the data DT is commonly supplied to the input terminals D of the FFs 35 and 37. The clock terminal C of the FF 35 is supplied with the clock signal CK obtained by ½-dividing the frequency of the data timing signal TM with the FF 13. Further, the clock terminal C of the FF 37 is supplied with the clock signal /CK inverted by the EOR 38. As a result, the present interface circuit is identical in circuit configuration to that shown in FIG. 1 and hence the operation similar to that executed by the first embodiment is performed.

Since the interface circuit according to the third embodiment has the selectors 14 and 36 as described above, the CPU or the like can separate the data DT into the odd-numbered and even-numbered data and supply them to the interface circuit. Thus, the interface circuit has another advantage in that a method of reducing the data-transfer rates on the two data lines 33 and 34 and transferring the data DT, using the data line 33 and 34, thereby reducing EMI noise can also be selected, as well as an advantage similar to the first embodiment.

Incidentally, the present invention is not necessarily limited to the aforementioned embodiments. Various changes can be made thereto. Their modifications are as in the following (a) and (b), for example.

(a) Although the data DT is divided into the two: odd data signals DTO and even data signals DTE by the data distribution circuit (FFs 31 and 32), a number of FFs may further be used to divide the data DT into a number of data signals. As a result, the pulse widths of the latch signals L1, ..., Ln can be further lengthened and EMI noise can be further reduced.

For example, where the data are distributed to three group, three FFs are required and three clock signals each phase shifts 120 degrees each other are required. Where the data are distributed to four group, four FFs are required and four clock signals each phase shifts 90 degrees are required.

(b) The present invention is not limited to the circuit configurations shown in FIGS. 1, 3 and 4. If a circuit having a function similar to that of the above-described circuit is adopted, then any circuit configuration is applicable in the same manner as described above.

As has been described in detail above, the first embodiment has a frequency dividing means for dividing the frequency of a data timing signal into ½ to thereby generate clock signals and first and second holding means for respectively separating sequentially-input data into odd-numbered data and even-numbered data and holding them therein. Thus, the pulse widths of signals outputted from shift means for respectively latching these data become twice as large as ever, and power consumption and EMI noise can be reduced.

The second embodiment has first and second temporally store circuits for respectively receiving clock signals each having a cycle twice the cycle of a data timing signal, separating data sequentially inputted according to the clock signals into odd-numbered data and even-numbered data, and holding them therein. Thus, EMI noise from each clock transmission path can be reduced in addition to the effect obtained in the first embodiment.

According to the third embodiment, since shift circuit is comprised principally of asynchronous FFs, the shift me circuit ans can be simplified in circuit scale as compared with the shift circuit comprised of the synchronous FFs in all.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. An interface circuit comprising:
a clock signal generator outputting a clock signal and an inversion clock signal;
a shift signal generator receiving a start signal, the clock signal and the inversion clock signal, and outputting shift signals having odd shift signals and even shift signals, the odd shift signals including a first odd shift signal and subsequent odd shift signals, wherein the first odd shift signal is generated in response to the start signal and the clock signal, wherein the even shift signals are generated in response to a previous one of the odd shift signals and the inversion clock signal, and wherein the subsequent odd shift signals are generated in response to a previous one of the even shift signals and the clock signal;
a data distribution circuit receiving data, the clock signal and the inversion clock signal, said data distribution circuit outputting odd data in response to the data and the clock signal, and outputting even data in response to the data and the inversion clock signal;
a plurality of odd data output circuits each of which receives the odd data and outputs the received data in response to one of the odd shift signals, respectively; and
a plurality of even data output circuits each of which receives the even data and outputs the received data in response to one of the even shift signals, respectively.

2. An interface circuit according to claim 1, wherein said clock signal generator is a frequency divider receiving an original clock signal and outputting a frequency divided signal and an inversion signal thereof as the clock signal and the inversion clock signal.

3. An interface circuit according to claim 2, wherein said frequency divider is a flip flop circuit including a clock terminal receiving the original clock signal, an output terminal outputting the clock signal, an inverse output terminal outputting the inversion clock signal and an input terminal connected to the inverse output terminal thereof.

4. An interface circuit according to claim 1, wherein said clock signal generator includes a clock source and an inverter.

5. An interface circuit according to claim 1, wherein said shift signal generator is a shift register having a plurality of cascade connected flip flop circuits including a first flip flop circuit having a clock terminal receiving the clock signal, an input terminal receiving the start signal and an output terminal outputting the first odd shift signal, even flip flop circuits each having an enable terminal receiving the inversion clock signal, an input terminal receiving a previous one of the odd shift signals and an output terminal outputting one of the even shift signals, and odd flip flop circuits each having an enable terminal receiving the clock signal, an input terminal receiving a previous one of the even shift signals and an output terminal outputting one of the subsequent odd shift signals.

6. An interface circuit according to claim 1, wherein said data distribution circuit includes a first flip flop circuit having an input terminal receiving the data, an output terminal outputting the odd data and a clock terminal receiving the clock signal and a second flip flop circuit having an input terminal receiving the data, an output terminal outputting the even data and a clock terminal receiving the inversion clock signal.

7. An interface circuit according to claim 1, wherein each of said odd data output circuits is a flip flop circuit having an input terminal receiving the odd data, an enable terminal receiving one of the odd shift signals and an output terminal outputting the received data.

8. An interface circuit according to claim 1, wherein each of said even data output circuits is a flip flop circuit having an input terminal receiving the even data, an enable terminal receiving one of the even shift signals and an output terminal outputting the received data.

9. An interface circuit comprising:
a clock signal generator outputting a first clock signal having a frequency and a second clock signal having the same frequency of the first clock signal and a predetermined delay with the first clock signal;
a shift signal generator receiving a start signal and the first and second clock signals, and outputting shift signals having first shift signals and second shift signals, the first shift signals including a top first shift signal and subsequent first shift signals, wherein the top first shift signal is generated in response to the start signal and the first clock signal, wherein the second shift signals are generated in response to a previous one of the first shift signals and the inversion clock signal, and wherein the subsequent first shift signals are generated in response to a previous one of the second shift signals and the clock signal;

a data distribution circuit receiving data and the first and second clock signals, said data distribution circuit outputting first data in response to the data and the first clock signal, and outputting second data in response to the data and the second clock signal;

a plurality of first data output circuits each of which receives the first data and outputs the received first data in response to one of the first shift signals, respectively; and a plurality of second data output circuits each of which receives the second data and outputs the received second data in response to one of the second shift signals, respectively.

10. An interference circuit according to claim 9, wherein said clock signal generator is a frequency divider receiving an original clock signal and outputting a frequency divided signal and an inversion signal thereof as the first and second clock signals.

11. An interface circuit according to claim 10, wherein said frequency divider is a flip flop circuit including a clock terminal receiving the original clock signal, an output terminal outputting the first clock signal, an inverse output terminal outputting the second clock signal and an input terminal connected to the inverse output terminal thereof.

12. An interface circuit according to claim 9, wherein said clock signal generator includes a clock source and an inverter.

13. An interface circuit according to claim 9, wherein said shift signal generator is a shift register having a plurality of cascade connected flip flop circuits including a top flip flop circuit having a clock terminal receiving the first clock signal, an input terminal receiving the start signal and an output terminal outputting the top first shift signal, first flip flop circuits each having an enable terminal receiving the second clock signal, an input terminal connected to the output terminal of a previous one of the first shift signals and an output terminal outputting one of the second shift signals, and second flip flop circuits each having an enable terminal receiving the first clock signal, input terminal connected to the output terminal of a previous one of the second shift signals and output terminal outputting one of the subsequent first shift signals.

14. An interface circuit according to claim 9, wherein said data distribution circuit includes a first flip flop circuit having an input terminal receiving the data, an output terminal outputting the first data and a clock terminal receiving the first clock signal and a second flip flop circuit having an input terminal receiving the data, an output terminal outputting the second data and a clock terminal receiving the second clock signal.

15. An interface circuit according to claim 9, wherein each of said first data output circuits is a flip flop circuit having an input terminal receiving the first data, an enable terminal receiving one of the first shift signals and an output terminal outputting the received data.

16. An interface circuit according to claim 9, wherein each of said second data output circuits is a flip flop circuit having an input terminal receiving the second data, an enable terminal receiving one of the second shift signals and an output terminal outputting the received data.

17. An interface circuit comprising:

a clock signal phase shifter outputting a plurality of clock signals each having the same frequency and a predetermined phase shift;

a shift signal generator receiving a start signal and the clock signals and outputting shift signals, wherein a top shift signal of the shift signals is generated in response to the start signal and one of the clock signals, and wherein each of the other shift signals generated in response to a previous one of the shift signals and a one of the clock signals having the predetermined phase shift from another one of the clock signals that the previous one of the shift signals was generated in response to;

a data distribution circuit receiving data and the clock signals, said data distribution circuit outputting shift data in response to the data and one of the clock signals so that the shift data are distributed depending on the predetermined phase shift value of one of the clock signals;

a plurality of data output circuits each of which receives the shift data distributed by the data distribution circuit and outputs the received shift data in response to one of the shift signals, respectively.

18. An interface circuit according to claim 17, wherein the predetermined phase shift is 180 degrees.

19. An interface circuit according to claim 17, wherein the predetermined phase shift is 90 degrees.

20. An interface circuit according to claim 17, wherein the predetermined phase shift is 120 degrees.

* * * * *